UNITED STATES PATENT OFFICE.

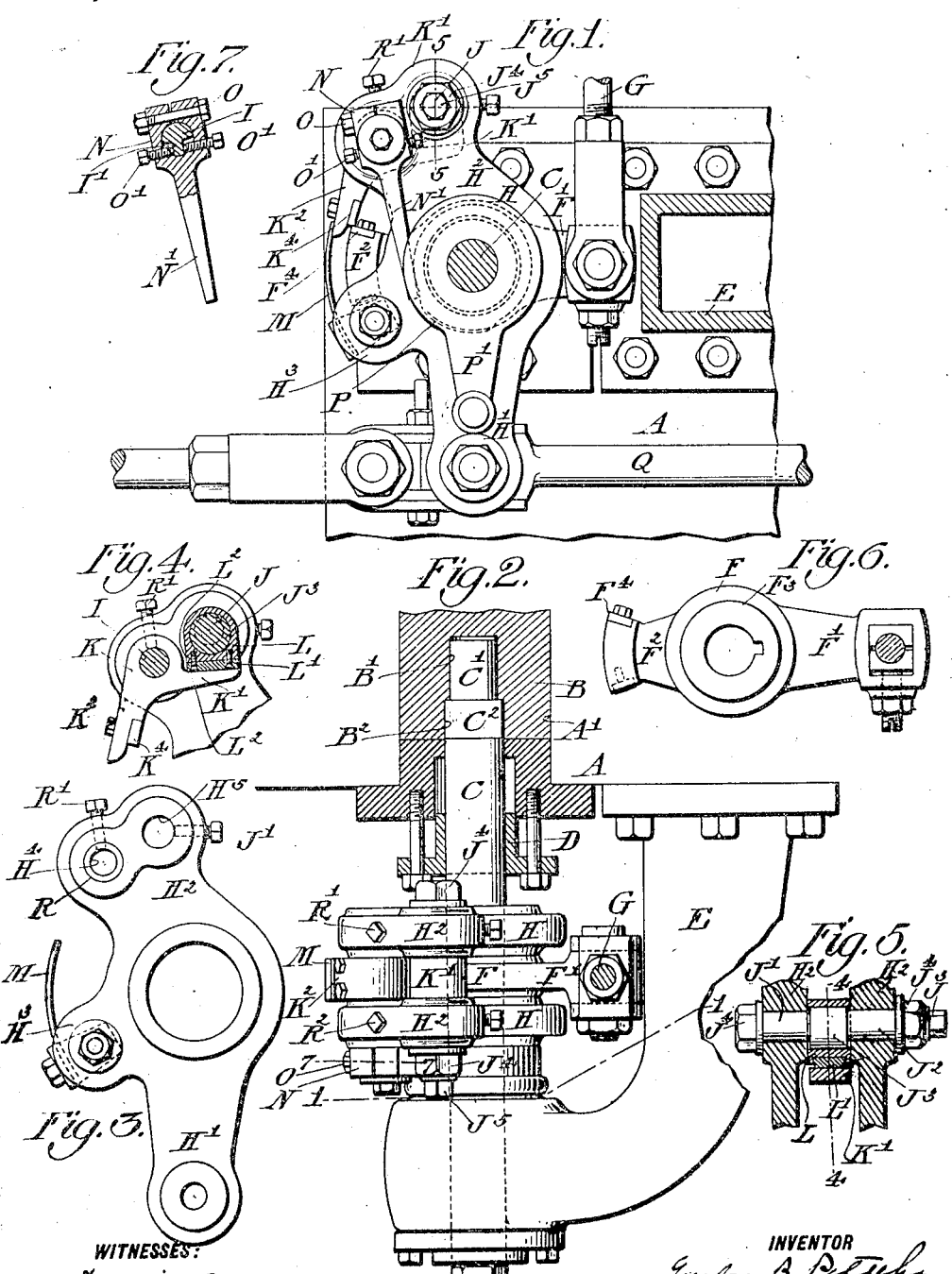

GUSTAV BERNHARD PETSCHE, OF PHILADELPHIA, PENNSYLVANIA, ASSIGNOR TO SOUTHWARK FOUNDRY AND MACHINE COMPANY, OF PHILADELPHIA, PENNSYLVANIA, A CORPORATION OF PENNSYLVANIA.

VALVE-ACTUATING MECHANISM.

No. 925,836.     Specification of Letters Patent.     Patented June 22, 1909.

Application filed February 25, 1907. Serial No. 359,288.

*To all whom it may concern:*

Be it known that I, GUSTAV B. PETSCHE, a subject of the Emperor of Germany, residing in the city and county of Philadelphia, in the State of Pennsylvania, have invented a certain new and useful Improvement in Valve-Actuating Mechanism, of which the following is a true and exact description, reference being had to the accompanying drawings, which form a part thereof.

My invention relates to valve actuating devices of the Corliss type and has for its object to provide improved mechanism for actuating the hook in such devices and particularly for limiting the movements of the hook on its pivotal attachment to the hook actuating lever or levers.

Broadly speaking, my invention consists in providing an adjustable buffer attachment adjustably secured to the hook actuating lever to limit the pivotal movement of the hook as desired, the buffer attachment preferably acting on a rearward extension of the hook lever.

My invention also comprises special details of construction for the buffer stop and also especial detailed improvements in the connection of the hook actuating shaft with the cam lever by which motion is given to it.

The nature of my improvements will be best understood as described in connection with the drawings in which they are illustrated and in which—

Figure 1 is a side elevation of a Corliss valve actuating mechanism provided with my improvements, the view being taken on the section line 1—1 of Fig. 2. Fig. 2, a plan view thereof, showing the connection with the valve in section. Fig. 3, a side elevation of one of the hook actuating lever members. Fig. 4, an elevation, partly in section on the line 4—4 of Fig. 5, of the end of one of said members and of the connected hook lever illustrating the buffer stop mechanism which I prefer to employ. Fig. 5 is a sectional elevation on the line 5—5 of Fig. 1. Fig. 6 is a side elevation of the valve actuating lever on which the hook operates, and Fig. 7 is a view showing the mode of attachment of the cam lever to the hook lever shaft, the view being taken partly in section on the line 7—7 of Fig. 2.

A indicates the shell of the engine cylinder having the port $A^1$ formed in it for the valve indicated at B, this valve having a slotted groove $B^2$ formed in its end and from the bottom of which extends the circular perforation $B^1$.

C is the valve actuating shaft having a squared section $C^2$ fitting in the groove $B^2$ and a cylindrical extension $C^1$ which fits in the perforation $B^1$.

D is a stuffing box of the usual kind and E the bracket which supports the outer end of the shaft C.

F is the valve actuating lever which is keyed to the shaft C and has the two arms $F^1$ and $F^2$, the arm $F^1$ being secured to the usual dash pot through a connecting rod G, and the arm $F^2$ being provided with a usual hardened steel abutment $F^4$ for the engagement of the hook. The hub of the lever F is extended out on both sides as indicated at $F^3$, these extensions serving as bearings for the spaced apart lever members H, H. The two members H are secured together and unite to form the hook actuating lever. As shown, each member H is formed with three arms, the one $H^1$ connected with the actuating rod Q, another $H^2$ supporting the shaft of the hook lever, and the third, $H^3$, supporting the spring M, which rests against the end of the hook lever, as indicated in Fig. 1.

K is the hook lever having its arm $K^2$ provided with a hardened steel abutment $K^4$ adapted to engage the similar abutment $F^4$ on the valve lever. This lever is formed with a stop engaging rearward extension $K^1$. The hook lever is secured to the shaft I, supported in bushings R held in perforations $H^4$ of the lever arms $H^2$ by set screws indicated at $R^1$. One end of the shaft I extends through to the outside of one of the hook actuating levers and this end, indicated at $I^1$, see Fig. 7, is cut away so as to afford positive abutment for the adjusting screws $O^1 O^1$ screwing into opposite sides of the split clamping head N, of the cam lever $N^1$, the split head being also secured to the end $I^1$ of the shaft by means of the clamp bolt O.

The ends $J^1$ and $J^2$ of a stop supporting pin or shaft pass through the perforations in the lever arms $H^2$. This pin has between its ends an eccentric portion $J^3$ preferably shorter than the space between the arms $H^2$ and advantageously greater in diameter than the ends of the pins.

The buffer stop L is in the form of a bushing surrounding the eccentric pin portion $J^3$ and formed with a flattened side against which a facing L¹ of leather, fiber or the like is secured by the countersunk screws L². The length of the bushing L is approximately equal to the distance between the lever arms H². Nuts J⁴ on the pin ends J¹ and J² serve to draw arms H² against the ends of the bushing and clamp the parts together with any desired angular adjustments of the pin and bushing L. A reduced portion J⁵ of the pin end J² is shaped to receive a wrench for adjusting the pin angularly when the nuts J⁴ are loosened.

In adjusting the bushing L, as when new blocks K⁴ and F⁴ are inserted or the like, the nuts J⁵ or one of them are loosened and the stop supporting pin rotated to vary the position of its eccentric portion and thereby of the bushing L, and the latter is adjusted angularly so that the extension K¹ of the hook lever will properly engage the flat facing L¹, as shown in Fig. 4, and the nuts J⁴ are then screwed home.

The general construction of the valve actuating mechanism shown in my drawings and the devices for securing the shaft C to the valve are new with me, but are not claimed in this application as they form the subject matter of my Patent No. 859,331, granted July 9, 1907, on an application copending with this.

My present invention has reference entirely to the mechanism for actuating and regulating the action of the hook lever, the leading novel feature in this mechanism being the provision of the adjustable buffer stop for regulating the pivotal throw of this lever; thus, in the construction illustrated, which I believe to be the best form of embodying the buffer stop in the mechanism, the bushing L serves as a buffer stop for the motion of the hook lever K² which may be readily adjusted whenever necessary to insure a proper engagement between the parts K⁴ and F⁴ and which by limiting the motion of the hook insures a proper operation of the parts.

In operation the levers H are oscillated back and forth in regular order by the operative connection Q. As the connecting rod Q is moved to the right the abutment K⁴ carried by the hook lever K engages the abutment F⁴ on the arm F² of the valve actuating lever F, whereby the valve spindle C is turned with the levers H to open the valve until the cam lever N¹ engages the cam P and causes the abutment K⁴ to be put out of engagement with the abutment F⁴. The position of the cam P is varied in the usual manner by the governor connection, not shown, to the lever P¹ carrying the cam P. When the abutment K⁴ is thrown out of engagement with the abutment F⁴ the valve spindle is turned back to the closed position by the dash pot connection G. The device described and especially illustrated in Fig. 7, enables the cam lever N¹ to be easily and noiselessly adjusted at the end of the shaft I to thereby adjust the angular relation between the cam lever N¹ and the hook lever K, thus insuring the actuation of the hook lever at the proper time. The mechanism disclosed as a whole is particularly valuable in insuring the correct and noiseless adjustment and operation of the parts with practically an elimination of all hammer blows which tend to distort the parts striking together and are besides undesirable by reason of the noise produced.

Having now described my invention, what I claim as new and desire to secure by Letters Patent is—

1. In a valve actuating device of the Corliss type, the combination of a hook actuating lever, a hook pivoted thereon, a buffer stop to limit the pivotal movement of the hook, and means for adjustably securing said stop to said lever.

2. In a valve actuating device of the Corliss type, the combination of a hook actuating lever, a hook pivoted thereon, and provided with a stop engaging portion, a pin adjustably secured to the actuating lever and a buffer stop mounted on and angularly adjustable about said pin.

3. In a valve actuating device of the Corliss type, the combination of a hook actuating lever, a hook pivoted thereon and provided with an extension, and a buffer stop adjustably secured to the actuating lever to engage the extension of the hook and limit the movement thereof.

4. In a valve actuating device of the Corliss type, the combination of a hook actuating lever, a hook pivoted thereon and provided with an extension, a pin secured to the actuating lever by means permitting angular adjustment of the pin, said pin having an eccentric portion, and a buffer mounted on and angularly adjustable with respect to said eccentric portion of said pin.

5. In a valve actuating device of the Corliss type, the combination of a hook actuating lever having portions spread apart, a hook pivoted to said lever between said portions and having a stop engaging portion, a coöperating stop, and means for adjustably securing said stop in place between said portions.

6. In a valve actuating device of the Corliss type, the combination of a hook actuating lever having portions spaced apart, a hook pivoted to said lever between said portions and having a stop engaging portion, a coöperating stop and means for adjustably securing said stop in place between said portions, said means including means for drawing said arms together to grip the stop between them.

7. In a valve actuating device of the Corliss type, the combination of a hook actuating lever having two portions spaced apart, a hook pivotally secured to said lever between said portions and provided with a stop engaging portion, a coöperating stop located between said arms and formed with an aperture, a pin journaled in said lever and provided with an eccentric portion between the said lever portions which passes through the aperture of said stop and means for securing said pin to said arms in different angular relations.

8. In a valve actuating device of the Corliss type the combination of a hook actuating lever having two portions spaced apart, a hook pivotally secured to said lever between said portions and provided with a stop engaging portion, a coöperating stop L having an aperture formed in it and having the hook engaging facing $L^1$, a pin having an eccentric portion $J^3$ passing through said aperture, and nuts on the ends of said pin for drawing said lever portions into engagement with the ends of said stop.

GUSTAV BERNHARD PETSCHE.

Witnesses:
ARNOLD KATZ,
JOHN E. HUBBELL.